M. C. NICKELL.
FRUIT GATHERER.
APPLICATION FILED MAR. 24, 1909.

948,579.

Patented Feb. 8, 1910.

Witnesses.

Inventor
Madison C. Nickell,
By Knight Bros
Attorneys.

UNITED STATES PATENT OFFICE.

MADISON C. NICKELL, OF GRAND RIVERS, KENTUCKY.

FRUIT-GATHERER.

948,579. Specification of Letters Patent. Patented Feb. 8, 1910.

Application filed March 24, 1909. Serial No. 485,373.

*To all whom it may concern:*

Be it known that I, MADISON C. NICKELL, a citizen of the United States, residing at Grand Rivers, county of Livingston, and State of Kentucky, have invented certain new and useful Improvements in Fruit-Gatherers, of which the following is a specification.

This invention relates to fruit gatherers. Fruit gatherers in the form of flexible receptacles to surround the trunks of trees have been known for many years. These receptacles, however, have in most instances been provided with discharges to which the fruits are directed by inclination of the bottom of the receptacles. As these discharges must be necessarily limited in number, many of the fruits seek the same discharge at one time, and as the fruits move with great force, upon impact they are bruised.

The object of my invention is to provide a gatherer in which the fruits instead of being compelled to move toward a few points move to positions where they are less liable to contact with each other, and from which they may be easily collected.

Other and further objects will appear in the following description and will be more particularly pointed out in the appended claims.

Figure 1:
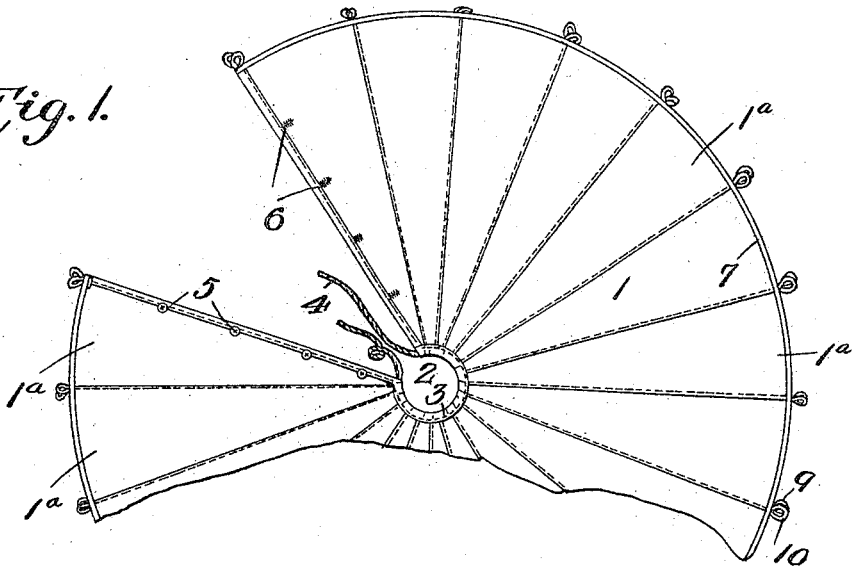
Figure 2:
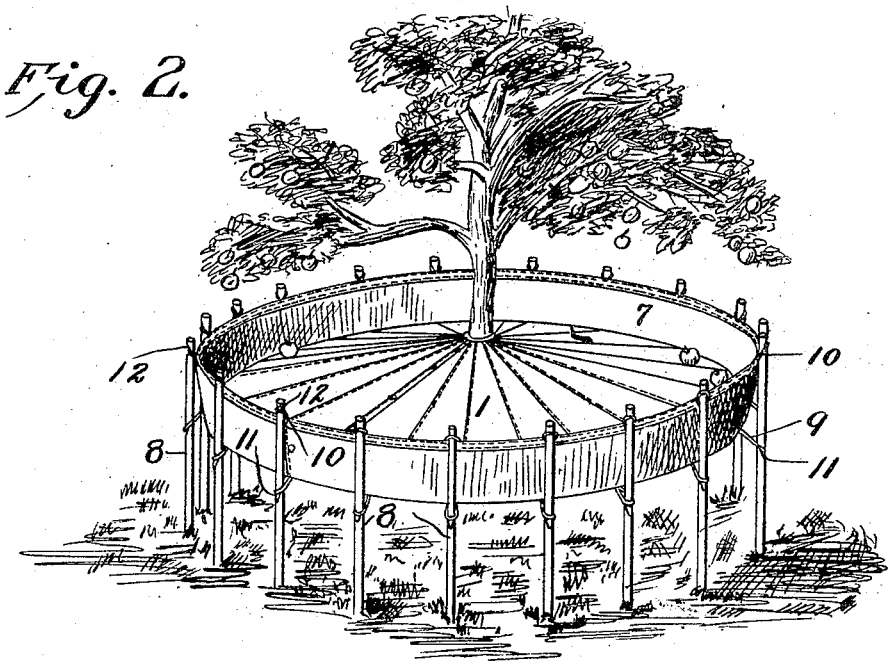

In the drawings, Figure 1 is a plan view of my invention spread out and not applied to a tree. Fig. 2 is a perspective view applied to a tree.

Referring more particularly to the drawings, 1 indicates a flexible conical shaped bottom member or floor, preferably formed of a number of sector shaped portions 1ª, the center being cut away at 2 so that the bottom may surround the trunk of a tree. The edge of the bottom surrounding the opening is provided with a hem 3 through which is passed a draw string 4 by which the bottom may be tightly fitted to the trunk of a tree so as to be supported at its center. The edges at the base of the bottom member are provided with suitable fastening devices, those shown being buttons 5 near one lateral edge and button holes 6 near the other lateral edge. When the edges are secured together, the bottom or floor assumes a conical form. Secured at its lower edge to the outer edge of the conical bottom member is a side wall 7, the upper and the lower edge of the wall being approximately the same length, and also equal in length to the perimeter of the base of the bottom. The ends of the wall are connected together by suitable fastening devices, as for instance, by buttons and buttonholes.

The gatherer is supported by a number of stakes or uprights 8 which may be of wood, iron or any other suitable material. To secure the gatherer to the uprights there is provided a number of pairs of loops 9 and 10 on the outside of the gatherer, one member 9 of each pair being located at the bottom of the side wall 7 and the other member 10 being located at the top of the wall. The loops 9 are preferably located so that they will be alined with the seams which connect the sector shaped portions 1ª of the conical shaped bottom, thus throwing the strains on the seams.

To secure the gatherer to a tree, the center of the conical bottom member is first secured to the trunk, and then the end edges thereof and the side wall are secured together. Stakes are now passed through the pairs of loops 9 and 10, and driven in the ground at proper distances from the tree trunk, the distance being soon ascertained by practice. After all the stakes have been driven, the lower loops are pulled downwardly on the stakes to give the bottom of the receptacle the shape of a cone, and are anchored in their pulled positions in notches 11 formed in the stakes in any suitable manner. The top loops 10 are then pulled upwardly to stretch the side wall and are anchored in notches 12. The upper and the lower loops being separate, it is possible to secure greater tension on the bottom and side wall. The fruit dropping from the tree will fall on the inclined bottom and be carried to the outer edge of the latter, thus being separated instead of being concentrated at one or more points. At the outer edge the fruit may be easily reached by hand and then carefully packed.

A further advantage of this invention is that the loops maintain the side wall in spaced relation to the stakes and thus prevent the fruit impinging the stakes and becoming bruised.

Having thus described my invention, what I claim and desire to secure by Letters Patent is:—

1. A fruit gatherer, comprising a plurality of sector-shaped sections, said sections being arranged radially with their vertices at the center and inclined downwardly from their center, the sides of said sections being secured together; a substantially vertical side wall attached to the outer edge of the sector-shaped sections, supports located without said wall, and means connecting the wall to the supports, whereby the upper edge of the wall will be in contact, and the lower edge thereof will be out of contact, with the said supports.

2. A fruit gatherer, having a floor inclined downwardly from its center toward its perimeter, and an upwardly extending side wall secured continuously to said floor throughout the entire extent of its perimeter.

3. A fruit gatherer having a conical bottom and a substantially vertical side wall secured directly together, loops attached in pairs at the top and the bottom of the side wall, and means supporting said side wall and located outside thereof, said loops adapted to engage said means.

4. The combination with a conical bottom composed of sector-shaped sections, having means for securing the vertex thereof to a tree and means for securing the side edges of the sector-shaped sections together, of a side wall having the upper and lower edges thereof of a length approximately equal to the perimeter of the bottom member, and loops attached in pairs at the lower and the upper edges of the side wall and secured thereto, means for supporting said side wall and located outside thereof, the said loops constructed to engage said means.

The foregoing specification signed at Grand Rivers, Ky. this 1st day of June, 1908.

MADISON C. NICKELL.

In presence of—
C. M. EVERETT,
R. L. TALLY.